United States Patent
Lee et al.

(10) Patent No.: US 6,400,831 B2
(45) Date of Patent: *Jun. 4, 2002

(54) SEMANTIC VIDEO OBJECT SEGMENTATION AND TRACKING

(75) Inventors: Ming-Chieh Lee, Bellevue; Chuang Gu, Redmond, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,280

(22) Filed: Apr. 2, 1998

(51) Int. Cl.[7] .................................................. G06K 9/00

(52) U.S. Cl. ....................... 382/103; 348/169

(58) Field of Search ................................ 382/103, 128, 382/308, 133, 258, 199, 236, 256, 257; 340/990

(56) References Cited

U.S. PATENT DOCUMENTS

| | | |
|---|---|---|
| 3,873,972 A | 3/1975 | Levine |
| 4,630,306 A | 12/1986 | West et al. |
| 4,745,633 A | 5/1988 | Waksman et al. |
| 4,751,742 A | 6/1988 | Meeker |
| 4,754,492 A | 6/1988 | Malvar |
| 4,783,833 A | 11/1988 | Kawabata et al. |
| 4,802,005 A | 1/1989 | Kondo |
| 4,833,721 A | 5/1989 | Okutomi et al. |
| 4,905,295 A | 2/1990 | Sato |
| 4,912,549 A | 3/1990 | Altman et al. |

(List continued on next page.)

FOREIGN PATENT DOCUMENTS

| | | |
|---|---|---|
| EP | 395 293 A1 | 10/1990 |
| EP | 474 307 A2 | 3/1992 |
| EP | 497 586 A2 | 8/1992 |
| EP | 0579319 A2 | 1/1994 |
| EP | 614 318 A2 A3 | 9/1994 |
| EP | 625 853 A2 | 11/1994 |
| WO | WO 91/11782 | 8/1991 |
| WO | WO 97/05746 | 2/1997 |

OTHER PUBLICATIONS

Diehl, "Object–Oriented Motion Estimation And Segmentation In Image Sequences," *Signal Processing Image Communication*, vol. 3, No. 1, pp. 23–56 (1991).

Gu, 3D Contour Image Coding Based on Morphological Filters and Motion Estimation, ICASSP94, 277–280, 1994.

Gu et al., Morphological Moving Object Segmentation and Tracking for Content–Based Video Coding, International Symposium on Multimedia Communication and Video Coding, New York, 1995, Plenum Press.

(List continued on next page.)

*Primary Examiner*—Andrew W. Johns
*Assistant Examiner*—Abolfazl Tabatabai
(74) *Attorney, Agent, or Firm*—Klarquist Sparkman, LLP

(57) ABSTRACT

A semantic video object extraction system using mathematical morphology and perspective motion modeling. A user indicates a rough outline around an image feature of interest for a first frame in a video sequence. Without further user assistance, the rough outline is processed by a morphological segmentation tool to snap the rough outline into a precise boundary surrounding the image feature. Motion modeling is performed on the image feature to track its movement into a subsequent video frame. The motion model is applied to the precise boundary to warp the precise outline into a new rough outline for the image feature in the subsequent video frame. This new rough outline is then snapped to locate a new precise boundary. Automatic processing is repeated for subsequent video frames.

26 Claims, 9 Drawing Sheets

(4 of 9 Drawing Sheet(s) Filed in Color)

U.S. PATENT DOCUMENTS

| | | |
|---|---|---|
| 4,961,231 A | 10/1990 | Nakayama et al. |
| 4,999,705 A | 3/1991 | Puri |
| 5,020,121 A | 5/1991 | Rosenberg |
| 5,031,225 A | 7/1991 | Tachikawa et al. |
| 5,034,986 A | 7/1991 | Karmann et al. |
| 5,067,014 A | 11/1991 | Bergen et al. |
| 5,070,465 A | 12/1991 | Kato et al. |
| 5,073,955 A | 12/1991 | Evers |
| 5,086,477 A | 2/1992 | Yu et al. |
| 5,103,305 A | 4/1992 | Watanabe |
| 5,103,306 A | 4/1992 | Weiman et al. |
| 5,117,287 A | 5/1992 | Koike et al. |
| 5,136,659 A | 8/1992 | Kaneko et al. |
| 5,148,497 A | 9/1992 | Pentland et al. |
| 5,155,594 A | 10/1992 | Bernstein et al. |
| 5,214,504 A | 5/1993 | Toriu et al. |
| 5,251,030 A | 10/1993 | Tanaka |
| 5,258,836 A | 11/1993 | Murata |
| 5,259,040 A | 11/1993 | Hanna |
| 5,274,453 A | 12/1993 | Maeda |
| 5,294,979 A | 3/1994 | Patel et al. |
| 5,295,201 A | 3/1994 | Yokohama |
| 5,329,311 A | 7/1994 | Ward et al. |
| 5,376,971 A | 12/1994 | Kadono et al. |
| 5,424,783 A | 6/1995 | Wong |
| 5,459,519 A | 10/1995 | Scalise et al. |
| 6,026,182 A | 10/1995 | Lee et al. |
| 5,467,442 A | 11/1995 | Tsubota et al. |
| 5,471,535 A | 11/1995 | Ikezawa et al. |
| 5,477,272 A | 12/1995 | Zhang et al. |
| 5,692,063 A | 1/1996 | Lee et al. |
| 5,778,098 A | 3/1996 | Lee et al. |
| 5,517,327 A | 5/1996 | Nakatani et al. |
| 5,524,068 A * | 6/1996 | Kacandes et al. ........... 382/258 |
| 5,546,129 A | 8/1996 | Lee |
| 5,557,684 A | 9/1996 | Wang et al. |
| 5,748,789 A | 10/1996 | Lee et al. |
| 5,572,258 A | 11/1996 | Yokoyama |
| 5,574,572 A | 11/1996 | Malinowski et al. |
| 5,577,131 A * | 11/1996 | Oddou ....................... 382/308 |
| 5,581,308 A | 12/1996 | Lee |
| 5,594,504 A | 1/1997 | Ebrahimi |
| 5,598,215 A | 1/1997 | Watanabe |
| 5,598,216 A | 1/1997 | Lee |
| 5,612,743 A | 3/1997 | Lee |
| 5,621,660 A | 4/1997 | Chaddha et al. |
| 5,627,591 A | 5/1997 | Lee |
| 5,642,166 A | 6/1997 | Shin et al. |
| 5,666,434 A * | 9/1997 | Nishikawa et al. ......... 382/128 |
| 5,668,608 A | 9/1997 | Lee |
| 5,673,339 A | 9/1997 | Lee |
| 5,684,509 A | 11/1997 | Hatanaka et al. |
| 5,684,886 A | 11/1997 | Kamada et al. |
| 5,694,487 A | 12/1997 | Lee |
| 5,706,417 A | 1/1998 | Adelson |
| 5,717,463 A | 2/1998 | Brailean et al. |
| 5,731,836 A * | 3/1998 | Lee ............................. 382/308 |
| 5,731,849 A | 3/1998 | Kondo et al. |
| 5,734,737 A | 3/1998 | Chang et al. |
| 5,761,341 A | 6/1998 | Go |
| 5,764,814 A | 6/1998 | Chen et al. |
| 5,784,175 A | 7/1998 | Lee |
| 5,799,113 A * | 8/1998 | Lee ............................. 382/256 |
| 5,802,220 A | 9/1998 | Black et al. |
| 5,809,161 A * | 9/1998 | Auty et al. ................. 382/103 |
| 5,946,043 A | 8/1999 | Lee et al. |
| 5,946,419 A | 8/1999 | Chen et al. |
| 5,978,497 A * | 11/1999 | Kacandes et al. ........... 382/133 |
| 6,005,493 A * | 12/1999 | Taniguchi et al. .......... 340/990 |
| 6,005,625 A | 12/1999 | Yokoyama |
| 6,037,988 A | 3/2000 | Gu et al. |

OTHER PUBLICATIONS

Kunt et al., Second Generation Image–Coding Techniques, Proceeding of IEEE, vol. 73, No. 4, 1985.

Marques et al., Object Tracking for Content–Based Functionalities, VCIP '97, vol. 3024, No. 1, 190–199, San Jose, Feb. 1997.

Marr, Vision, W.H. Freeman, New York, Chapter 4, 268–294, 1982.

Meyer et al., Region–Based Tracking in an Image Sequence, ECCV '92, 476–484, Santa Margherita, Italy, May 1992.

Musmann et al., Object–Oriented Analysis–Synthesis Coding of Moving Images, Signal Processing: Image Communication, vol. 1, No. 2, 117–138, Oct. 1989.

Salembier et al., Region–Based Video Coding Using Mathematical Morphology, Proceeding of the IEEE, vol. 83, No. 6, 843–857, Jun. 1995.

Coding of Audio, Picture, Multimedia and Hypermedia Information, ISO/IEC 14496–2, (ISO/IEC JTC 1/SC 29 N 2602) May 1998.

Black, Combining Intensity and Motion for Incremental Segmentation and Tracking Over Long Image Sequences, ECCV '92, 485–493, Santa Margherita, Italy, May 1992.

Brady et al., Computational Efficient Estimation of Polynomial Model–based Motion, Proceedings of Picture Coding Symposium 1996, Melbourn, Mar. 1996.

Brady et al., Object Detection and Tracking Using an Em–Based Motion Estimation and Segmentation Framework, ICIP '96, vol. 1, 925–928, Lausanne, Switzerland, Sep. 1996.

Rui et al., Digital Image/Video Library and MPEG–7: Standardization and Research Issues, ICASSP '98, Seattle, May 1998.

Wang et al., Representing Moving Images with Layers, IEEE Transations on Image Processing, vol. 3, No. 5, Sep. 1994.

Burt et al., Segmentation and estimation of image region properties through cooperative hierarchical computation, IEEE Trans. On System, Man and Cybernetics, vol. 11, pp. 802–809, 1981.

Canny, A computational approach to edge detection, IEEE Trans. Pattern Analysis and Machine Intelligence, vol. 8, pp. 679–698, 1986.

Chen et al., Image segmentation as an estimation problem, Computer Graphics and Image Processing, vol. 13, pp. 153–172, 1980.

Cover et al., Nearest neighbor pattern classification, IEEE Trans. Information Theory, vol. 13, pp. 21–27, 1967.

Gu, Multi–valued morphology and segmentation–based coding, Ph.D. dissertation, LTS/–EPFL, http://–ltswww.–epfl.–ch/–Staff/gu.html, 1995.

Haralick et al., Image segmentation techniques, CVGIP, vol. 29, pp. 100–132, 1985.

Lee et al., A layered video object coding system using sprite and affine motion model, IEEE Tran. on Circuits and System for Video Technology, vol. 7, No. 1, Jan. 1997.

Meyer, Color image segmentation, 4th International Conference on Image Processing and its applications, pp. 303–304, Netherlands, May 1992.

Sanson, Motion Affine Models Identification and Application to Television Image Coding, SPIE vol. 1605 Visual Communications and Image Processing '91: Visual Communications, Nov. 11, 1991, pp. 570–581.

Hötter, Optimization and Efficiency of an Object–Oriented Analysis–Synthesis Coder, IEEE Transations on Circuits and Systems for Video Technology, Apr. 4, 1994, No. 2, pp 181–194.

Zakhor et al., Edge–Based 3–D Camera Motion Estimation with Application to Video Coding, IEEE Transactions on Image Processing, vol. 2, Oct. 2, 1993, pp. 481–498.

Meyer et al., Region–Based Tracking Using Affine Motion Models in Long Image Sequences, CVGIP: Image Understanding, vol. 60, No. 2, Sep. 1994, pp. 119–140.

Ozer, Why MPEG is Hot, PC Magazine, Apr. 11, 1995, pp. 130–131.

Fogg, Survey of Software and Hardware VLC Architectures, SPIE vol. 2186, pp. 29–37.

Video Coding for Low Bitrate Communication, Draft Recommendation H.263, International Telecommunication Union, Dec. 1995, 51 pages.

Foley et al., Computer Graphics Principles and Practice, Addison–Wesley Publishing Company, Inc., 1990, pp. 835–851.

Nieweglowski et al., A Novel Video Coding Scheme Based on Temporal Prediction Using Digital Image Warping, IEEE Transactions on Consumer Electronics, vol. 39, No. 3, Aug. 1993, pp 141–150.

Orchard, Predictive Motion–Field Segmentation for Image Sequence Coding, IEEE Transactions on Circuits and Systems for Video Technology, vol. 3, No. 1, Feb. 1993, pp 54–70.

Seferidis et al., General Approach to Block–Matching Motion Estimation, Optical Engineering, vol. 32, No. 7, Jul. 1993, pp. 1464–1474.

Chang et al., Transform Coding of Arbitrarily–Shaped Image Segments, Proceedings of the ACM Multimedia 93, Aug. 1, 1993, pp. 83–90.

Chen et al., A Block Transform Coder for Arbitrarily Shaped Image Segments, ICIP–94, vol. I/III, Nov. 13, 1994, pp. 85–89.

Franke et al., Constrained Iterative Restoration Techniques: A Powerful Tool in Region Oriented Texture Coding, Signal Processing IV: Theories and Applications, Sep. 1988, pp. 1145–1148.

Pennebaker et al., JPEG Still Image Data Compression Standard, Chapter 20, pp. 325–349, 1993.

Wong, Nonlinear Scale–Space Filtering and Multiresolution System, 1995, IEEE, pp. 774–787.

Defée et al., Nonlinear Filters in Image Pyramid Generation, 1991 IEEE, pp. 269–272.

Ranka et al., Efficient Serial and Parallel Algorithms for Median Filtering, 1991 IEEE, pp. 1462–1466.

Haddad et al, Digital Signal Processing, Theory, Applications, and Hardware, 1991, pp. 257–261.

PCT/US96/15892 search report dated Feb. 17, 1997.

PCT/US96/15892 search report dated Apr. 28, 1997.

PCT/US97/04662 search report dated Jul. 9, 1997.

Bonnaud et al., "Multiple Occluding Object Tracking Using a Non–Redundant Boundary–Based Representation," ICIP 97, pp. 426–29 (Oct. 1997).

Gu et al., "Combined Gray–Level and Motion Segmentation for Very Low Bit–Rate Coding," SPIE, vol. 2451, pp. 121–29 (Mar. 1995).

Haddad et al., "Digital Signal Processing, Theory, Applications, and Hardware," pp. 257–261 (1991).

ISO, ISO/IEC JTCI/SC29/WG11, Information Technology–Coding of Audio–Visual Objects: Visual,"Preprocessing and Postprocessing," ISO/IEC 14496–2, pp. 303–308 (May 1998).

ISO, ISO/IEC JTCI/SC29/WG11, Information Technology–Coding of Audio–Visual Objects: Visual, ISO/IEC 14496–2, pp. 183–190, (May 1998).

International Organization for Standardisation ISO/IEC JTCI/SC29/WG11,N2459 "Overview of the MPEG–$ Standard," (Oct. 1998).

Moscheni et al., "Object Tracking Based on Temporal and Spatial Information," ICASSP 96, 1914–17 (May 1996).

Pipitone et al., "Tripod Operators for Recognizing Objects in Range Images: Rapid Rejection of Library Objects," IEEE, pp. 1596–1601 (1992).

Salembier, P. et al., "Segmentation–Based Video Coding System Allowing the Manipulation of Objects", IEEE Transactions on Circuits and Systems for Video Technology," vol. 7, No. 1, pp. 60–73 (Feb. 1997).

Toklu et al., "Simultaneous Alpha Map Generation and 2–D Mesh Tracking for Multimedia Applications," ICIP 97, pp. 113–16 (Oct. 1997).

Wu, L. et al., "Spatio–Temporal Segmentation of Image Sequences for Object–Oriented Low Bit–Rate Image Coding," Signal Processing: Image Communication 8," vol. 8, No. 6, pp. 513–543 (1996).

* cited by examiner 252  256  250  254

302  300  304

SEMANTIC VIDEO OBJECT SEGMENTATION AND TRACKING

FIELD OF THE INVENTION

The invention relates to semantic video object extraction and tracking.

BACKGROUND OF THE INVENTION

A video sequence is composed of a series of video frames, where each frame records objects at discrete moments in time. In a digital video sequence, each frame is represented by an array of pixels. When a person views a video frame, it is easy to recognize objects in the video frame, because the person can identify a portion of the video frame as being meaningful to the user. This is called attaching semantic meaning to that portion of the video frame. For example, a ball, an aircraft, a building, a cell, a human body, etc., all represent some meaningful entities in the world. Semantic meaning is defined with respect to the user's context. Although vision seems simple to people, a computer does not know that a certain collection of pixels within a frame depicts a person. To the computer, it is only a collection of pixels. However, a user can identify a part of a video frame based upon some semantic criteria (such as by applying an is a person criteria), and thus assign semantic meaning to that part of the frame; such identified data is typically referred to as a semantic video object.

An advantage to breaking video stream frames into one or more semantic objects (segmenting, or content based encoding) is that in addition to compression efficiency inherent to coding only active objects, received data may also be more accurately reconstructed because knowledge of the object characteristics allows better prediction of its appearance in any given frame. Such object tracking and extraction can be very useful in many fields. For example, in broadcasting and telecommunication, video compression is important due to a large bandwidth requirement for transmitting video data. For example, in a newscast monologue with a speaker in front of a fairly static background, bandwidth requirements may be reduced if one identifies (segments) a speaker within a video frame, removes (extracts) the speaker off the background, and then skips transmitting the background unless it changes.

Using semantic video objects to improve coding efficiency and reduce storage and transmission bandwidth has been investigated in the up-coming international video coding standard MPEG4. (See ISO/IEC JTC1/SC29/WG11. *MPEG4 Video Verification Model Version* 8.0, July. 1997; Lee, et al., A layered video object coding system using sprite and affine motion model, IEEE Tran. on Circuits and System for Video Technology, Vol. 7, No. 1, January 1997.) In the computer domain, web technology has new opportunities involving searching and interacting with meaningful video objects in a still or dynamic scene. To do so, extraction of semantic video objects is very important. In the pattern recognition domain, accurate and robust semantic visual information extraction aids medical imaging, industrial robotics, remote sensing, and military applications. (See Marr, *Vision*, W. H. Freeman, New York, 1982 (hereafter Marr).)

But, although useful, general semantic visual information extraction is difficult. Although human eyes see data that is easily interpreted by our brains as semantic video objects, such identification is a fundamental problem for image analysis. This problem is termed a segmentation problem, where the goal is to aid a computer in distinguishing between different objects within a video frame. Objects are separated from each other using some homogeneous criteria. Homogeneity refers to grouping data according to some similar characteristic. Different definitions for homogeneity can lead to different segmentation results for the same input data. For example, homogeneous segmentation may be based on a combination of motion and texture analysis. The criteria chosen for semantic video object extraction will determine the effectiveness of the segmentation process.

During the past two decades, researchers have investigated unsupervised segmentation. Some researches proposed using homogeneous grayscale/or homogenous color as a criterion for identifying regions. Others suggest using homogenous motion information to identify moving objects. (See Haralick and Shapiro, *Image segmentation techniques*, CVGIP, Vol. 29, pp. 100–132, 1985; C. Gu, Multi-valued morphology and segmentation-based coding, Ph.D. dissertation, LTS/EPFL, (hereafter Gu Ph.D.), http://Itswww.epfl.-ch/Staff/gu.html, 1995.)

This research in grayscale-oriented analysis can be classified into single-level methods and multi-level approaches. Single-level methods generally use edge-based detection methods, k-nearest neighbor, or estimation algorithms. (See Canny, A computational approach to edge detection, IEEE Trans. Pattern Analysis and Machine Intelligence, Vol. 8, pp. 679–698, 1986; Cover and Hart, Nearest neighbor pattern classification, IEEE Trans. Information Theory, Vol. 13, pp. 21–27, 1967; Chen and Pavlidis, Image segmentation as an estimation problem, Computer Graphics and Image Processing, Vol. 13, pp. 153–172, 1980).

Unfortunately, although these techniques work well when the input data is relatively simple, clean, and fits the model well, they lack generality and robustness. To overcome these limitations, researchers focused on multi-level methods such as split and merge, pyramid linking, and morphological methods. (See Burt, et al., Segmentation and estimation of image region properties through cooperative hierarchical computation, IEEE Trans. On System, Man and Cybernetics, Vol. 11, pp. 802–809, 1981).

These technologies provide better performance than the prior single-level methods, but results are inadequate because these methods do not properly handle video objects that contain completely different grayscales/colors. An additional drawback to these approaches is that research in the motion oriented segmentation domain assumes that a semantic object has homogeneous motion.

Well known attempts have been made to deal with these problems. These include Hough transformation, multi-resolution region-growing, and relaxation clustering. But, each of these methods is based on optical flow estimation. This estimation technique is known to frequently produce inaccurately determined motion boundaries. In addition, these methods are not suitable to semantic video object extraction because they only employ homogeneous motion information while a semantic video object can have complex motions inside the object (e.g. rigid-body motion).

In an attempt to overcome these limitations, subsequent research focused on object tracking. This is a class of methods related to semantic video object extraction, and which is premised on estimating an object's current dynamic state based on a previous one, where the trajectory of dynamic states are temporally linked. Different features of an image have been used for tracking frame to frame changes, e.g., tracking points, intensity edges, and textures. But these features do not include semantic information about the object being tracked; simply tracking control points or features ignores important information about the nature of the object that can be used to facilitate encoding and decoding compression data. Notwithstanding significant research in video compression, little of this research considers semantic video object tracking.

Recently, some effort has been invested in semantic video object extraction problem with tracking. (See Gu Ph.D.; C. Gu, T. Ebrahimi and M. Kunt, Morphological moving object segmentation and tracking for content-based video coding, International Symposium on Multimedia Communication and Video Coding, New York, 1995, Plenum Press.) This research primarily attempts to segment a dynamic image sequence into regions with homogeneous motions that correspond to real moving objects. A joint spatio-temporal method for representing spatial and temporal relationships between objects in a video sequence was developed using a morphological motion tracking approach. However, this method relies on the estimated optical flow, which, as noted above, generally is not sufficiently accurate. In addition, since different parts of a semantic video object can have both moving and non-moving elements, results can be further imprecise.

Thus, methods for extracting semantic visual information based on homogeneous color or motion criteria are unsatisfactory, because each homogeneous criterion only deals with a limited set of input configurations, and cannot handle a general semantic video object having multiple colors and multiple motions. Processing such a restricted set of input configurations results in partial solutions for semantic visual information extraction.

One approach to overcome limited input configurations has been to detect shapes through user selected points using an energy formulation. However, a problem with this approach is that positioning the points is an imprecise process. This results in imprecise identification of an image feature (an object within the video frame) of interest.

SUMMARY OF THE INVENTION

The invention allows automatic tracking of an object through a video sequence. Initially a user is allowed to roughly identify an outline of the object in a first key frame. This rough outline is then automatically refined to locate the object's actual outline. Motion estimation techniques, such as global and local motion estimation, are used to track the movement of the object through the video sequence. The motion estimation is also applied to the refined boundary to generate a new rough outline in the next video frame, which is then refined for the next video frame. This automatic outline identification and refinement is repeated for subsequent frames.

Preferably, the user is presented with a graphical user interface showing a frame of video data, and the user identifies, with a mouse, pen, tablet, etc., the rough outline of an object by selecting points around the perimeter of the object. Curve-fitting algorithms can be applied to fill in any gaps in the user-selected points. After this initial segmentation of the object, the unsupervised tracking is performed. During unsupervised tracking, the motion of the object is identified from frame to frame. The system automatically locates similar semantic video objects in the remaining frames of the video sequence, and the identified object boundary is adjusted based on the motion transforms.

Mathematical morphology and global perspective motion estimation/compensation (or an equivalent object tracking system) is used to accomplish these unsupervised steps. Using a set-theoretical methodology for image analysis (i.e. providing a mathematical framework to define image abstraction), mathematical morphology can estimate many features of the geometrical structure in the video data, and aid image segmentation. Instead of simply segmenting an image into square pixel regions unrelated to frame content (i.e. not semantically based), objects are identified according to a semantic basis and their movement tracked throughout video frames. This object-based information is encoded into the video data stream, and on the receiving end, the object data is used to re-generate the original data, rather than just blindly reconstruct it from compressed pixel regions. Global motion estimation is used to provide a very complete motion description for scene change from frame to frame, and is employed to track object motion during unsupervised processing. However, other motion tracking methods, e.g. block-based, mesh-based, parametric estimation motion estimation, and the like, may also be used.

The invention also allows for irregularly shaped objects, while remaining compatible with current compression algorithms. Most video compression algorithms expect to receive a regular array of pixels. This does not correspond well with objects in the real world, as real-world objects are usually irregularly shaped. To allow processing of arbitrarily shaped objects by conventional compression schemes, a user identifies a semantically interesting portion of the video stream (i.e. the object), and this irregularly shaped object is converted into a regular array of pixels before being sent to a compression algorithm.

Thus, a computer can be programmed with software programming instructions for implementing a method of tracking rigid and non-rigid motion of an object across multiple video frames. The object has a perimeter, and initially a user identifies a first boundary approximating this perimeter in a first video frame. A global motion transformation is computed which encodes the movement of the object between the first video frame and a second video frame. The global motion transformation is applied to the first boundary to identify a second boundary approximating the perimeter of the object in the second video frame. By successive application of motion transformations, boundaries for the object can be automatically identified in successive frames.

Alternatively, after the user identifies an initial approximate boundary near the border/perimeter of the object, an inner boundary inside the approximate boundary is defined, and an outer boundary outside the approximate boundary is defined. The inner border is expanded and the outer boundary contracted so as to identify an outline corresponding to the actual border of the object roughly identified in the first frame. Preferably expansion and contraction of the boundaries utilizes a morphological watershed computation to classify the object and its actual border.

A motion transformation function representing the transformation between the object in the first frame and the object of the second frame, can be applied to the outline to warp it into a new approximate boundary for the object in the second frame. In subsequent video frames, inner and outer boundaries are defined for the automatically generated new approximate boundary, and then snapped to the object. Note that implementations can provide for setting an error threshold on boundary approximations (e.g. by a pixel-error analysis), allowing opportunity to re-identify the object's boundary in subsequent frames.

The foregoing and other features and advantages will be more readily apparent from the following detailed description, which proceeds with reference to the accompanying drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

Figure 1:
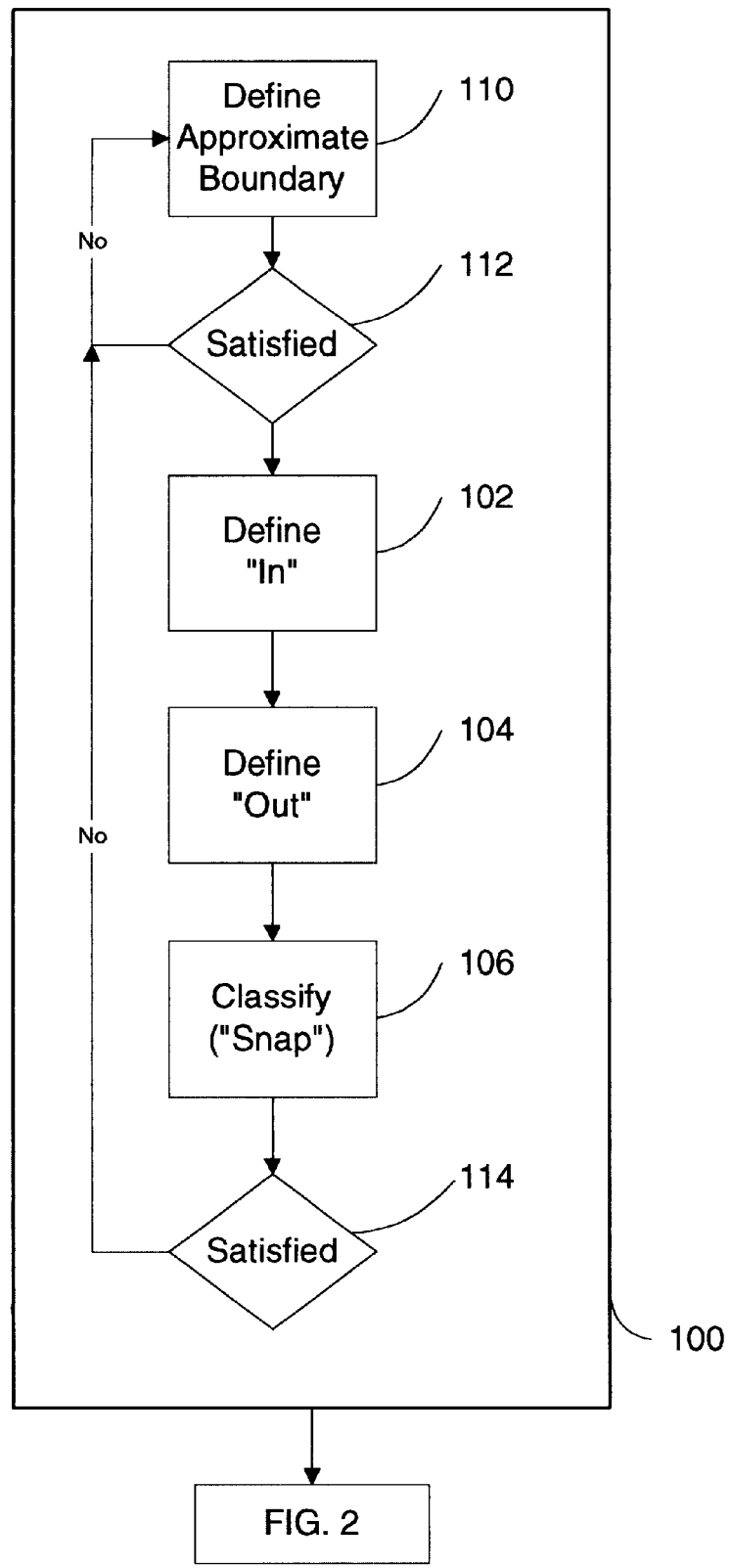
FIG. 1 is a flowchart of an implementation of a semantic object extraction system.

It is expected that the invention will be implemented as computer program instructions for controlling a computer system; these instructions can be encoded into firmware chips such as ROMS or EPROMS. Such instructions can originate as code written in a high-level language such as C or C++, which is then compiled or interpreted into the controlling instructions.

Computer systems include as their basic elements a computer, an input device, and output device. The computer generally includes a central processing unit (CPU), and a memory system communicating through a bus structure. The CPU includes an arithmetic logic unit (ALU) for performing computations, registers for temporary storage of data and instructions, and a control unit for controlling the operation of computer system in response to instructions from a computer program such as an application or an operating system.

The memory system generally includes high-speed main memory in the form of random access memory (RAM) and read only memory (ROM) semiconductor devices, and secondary storage in the form of floppy disks, hard disks, tape, CD-ROM, etc. and other devices that use optical or magnetic recording material. Main memory stores programs, such as a computer's operating system and currently running application programs, and also includes video display memory. The input and output devices are typically peripheral devices connected by the bus structure to the computer. An input device may be a keyboard, modem, pointing device, pen, or other device for providing input data to the computer. An output device may be a display device, printer, sound device or other device for providing output data from the computer. It should be understood that these are illustrative elements of a basic computer system, and are not intended to a specific architecture for a computer system.

In a preferred embodiment, the invention is implemented as a software program code that is executed by the computer. However, as noted above, the invention can be encoded into hardware devices such as video processing boards and the like.

Overview

The implementation of the invention described below is basically an object tracking and extraction system that does not require any specific prior knowledge of the color, shape or motion of the data the system processes. Based on initial user input, the system automatically generates accurate boundaries for an identified semantic object as the object moves through a video sequence. Preferably, the semantic object is first defined by a user's tracing an initial outline for the object within an initial video frame. After the object is defined, the object is tracked in subsequent frames. Preferably, a graphical user interface is presented to the user which allows the user to identify as well as refine indication of the object's outline.

Preferred segmentation and tracking systems using one or more homogeneous (i.e. similar) criteria are used to indicate how to partition input data. Such criteria overcomes limitations in prior art methods of color or motion identification that do not provide for identification of semantic video objects. Here, identified object semantics is the basis for evaluating homogeneous criteria. That is, color, motion, or other identification can be used to identify a semantic object boundary, but the criteria is evaluated with respect to the user-identified semantic object. Therefore object color, shape or motion is not restricted.

FIG. 1 shows the two basic steps of the present system of semantic video object extraction. In the first step 100, the system needs a good semantic boundary for the initial frame, which will be used as a starting 2D-template for successive video frames. During this step a user indicates 110 the rough boundary of a semantic video object in the first frame with an input device such as a mouse, touch sensitive surface, pen, drawing tablet, or the like. Using this initial boundary, the system defines one boundary lying inside in the object, called the In boundary 102 and another boundary lying outside the object, called Out boundary 104. These two boundaries roughly indicate the representative pixels inside and outside the user-identified semantic video object. These two boundaries are then snapped 106 into a precise boundary that identifies an extracted semantic video object boundary. Preferably the user is given the opportunity to accept or reject 112, 114 the user selected and computer generated outlines.

The goal of the user assistance is to provide an approximation of the object boundary by just using the input device, without the user having to precisely define or otherwise indicate control points around the image feature. Requiring precise identification of control points is time consuming, as well as limiting the resulting segmentation by the accuracy of the initial pixel definitions. A preferred alternative to such a prior art method is to allow the user to identify and portray the initial object boundary easily and not precisely, and then have this initial approximation modified into a precise boundary.

Figure 2:
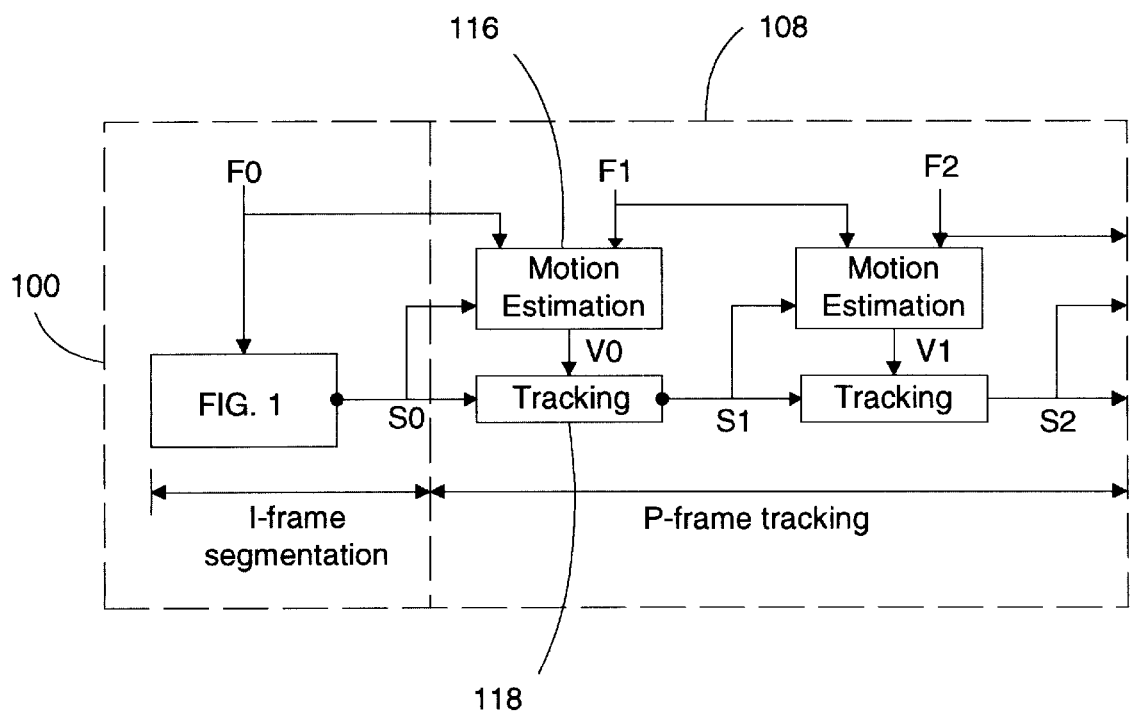
FIG. 2 is a continuation flow-chart of FIG. 1.

FIG. 2 shows the second step 108, in which the system finds similar templates in successive frames. Shown in FIG. 2 are $F_i$, representing each original frame, $V_i$, representing a corresponding motion information between the current semantic object boundary and the next one, and $S_i$ representing the final extracted semantic boundary. Note that after completing boundary extraction $S_i$, this $S_i$ becomes the starting frame F for the next frame i+1. That is, the results of a previous step becomes the starting input for the next step. FIG. 2 shows the initial frame $F_0$, and the tracking of an object's boundaries (from FIG. 1) through two successive frames $F_1$ and $F_2$.

Step 108 depends primarily on a motion estimation algorithm 116 that describes the evolution between the previous semantic video object boundary and the current one. Preferably a global perspective algorithm is used, although other algorithms may be used instead. A tracking procedure 118 receives as its input the boundary data $S_0$ and motion estimation data $V_0$. Once the motion information $V_0$ is known, the approximate semantic video object boundary in the current frame can be obtained by taking the previous boundary identified by the user in the first step 100, and warping it towards the current frame. That is, tracking function 118 is able to compute a new approximate boundary for the semantic object in current frame $F_1$. by adjusting previous boundary data $S_0$ according to motion data $V_0$. As was done with the user-defined initial boundary, the new approximate boundary is snapped to a precise boundary $S_1$, and the process repeats with boundary $S_1$ becoming a new input for processing a subsequent frame $F_2$.

Both steps 100 and step 108 require the snapping of an approximate boundary to a precise one. As described below, a morphological segmentation can be used to refine the initial user-defined boundary (step 110) and the motion compensated boundary ($S_0$) to get the final precise boundary of the semantic video object.

Note that an error value may be included in the processing of the subsequent frames to allow setting a threshold after which a frame can be declared to be another initial frame requiring user assistance. A good prediction mechanism should result in small error values, resulting in efficient coding of a video sequence. However, in a lossy system, errors may accumulate. Although allowing for further user-based refinement is not necessary, such assistance can increase the compression quality for complex video sequences.

Boundary Approximation

Figure 3:
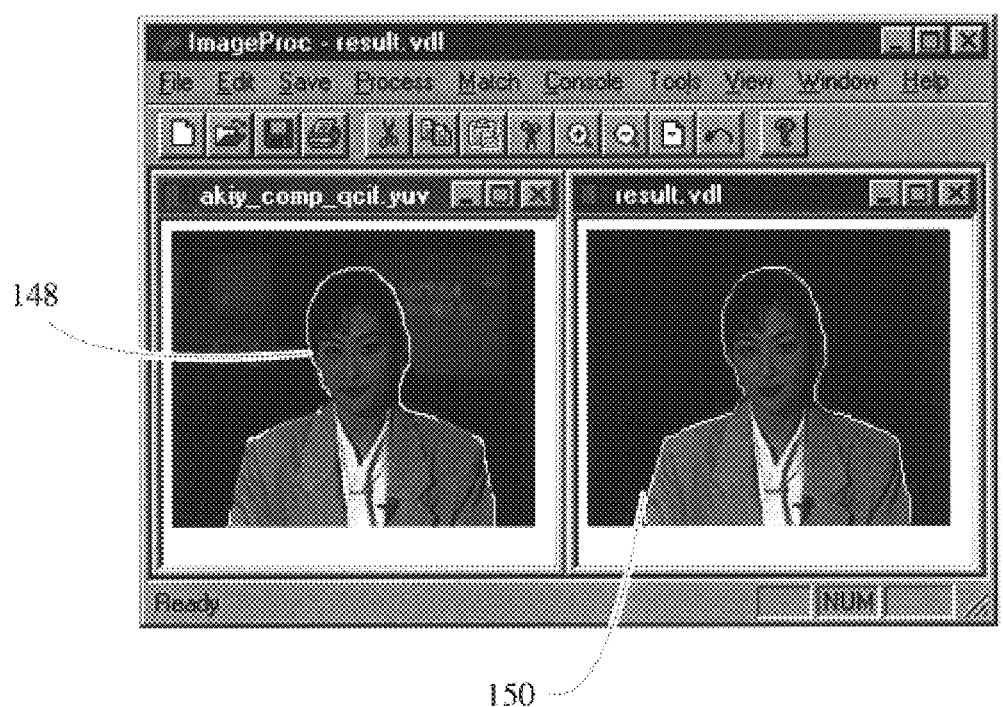
FIG. 3 shows a two-stage boundary outline approximation procedure.

FIG. 3 shows the results of a two-part approximation procedure, where the first part is the user's initial approximation of an image feature's outline 148, and the second part is refining that outline 150 to allow segmentation of the object from the frame.

For the first part 148, there are two general methods for identifying the initial boundary. The first is a pixel-based method in which a user inputs the position of interior (opaque) pixels and exterior (transparent) pixels. This method has the serious shortcoming that collecting the points is time consuming and prone to inaccuracies. In addition, unless many points are collected, the points do not adequately disclose the true shape of the image feature.

The second is a contour-based method in which a user only indicates control points along the outline of an object boundary, and splines or polygons are used to approximate a boundary based upon the control points. The addition of Splines is superior over the first method because it allows one to fill in the gaps between the indicated points. The drawback, however, is that a spline or polygon will generally produce a best-fit result for the input points given. With few points, broad curves or shapes will result. Thus, to get an accurate shape, many points need to be accurately placed about the image feature's true boundary. But, if it is assumed n nodes guarantees a desired maximal boundary approximation error of e pixels, at a minimum the user must then enter n keystrokes to define a border. For complex shapes, n may be a very large number. In order to avoid such reduce user effort, n can be decreased, but this approach yields larger e vales.

The limitations inherent to either prior art method may be overcome by combining the precision of the first pixel-based approach with the efficiency of the second spline/polygonal one, into a pixel-polygon approach for fixing an initial border around an image feature of interest. The complexity of the shape, e.g. straight or complicated boundary, can control whether a polygonal or pixel-wise approach is used for a particular portion of the boundary surrounding the image feature of interest. After the initial border is fixed, it is adjusted (FIG. 1 steps 102–106) to fit the semantic object's actual border.

As shown, a user has marked, with white points, portions of the left image 148 to identify an image feature of interest. Although it is preferable that the user define an entire outline around the image feature, doing so is unnecessary. As indicated above, gaps in the outline will be filled in with the hybrid pixel-polygon method. The right image 150 shows the initial object boundary after gaps in the initial outline of the left image 148 have been filled in. By allowing the user to draw the outline, the user is able to define many control points without the tedium of specifying each one individually. In the prior art, allowing such gaps in the border required a tradeoff between precision and convenience. The present invention avoids such a tradeoff by defining In and Out boundaries and modifying them to precisely locate the actual boundary of the (roughly) indicated image feature.

Approximation Adjustment

Figure 4:
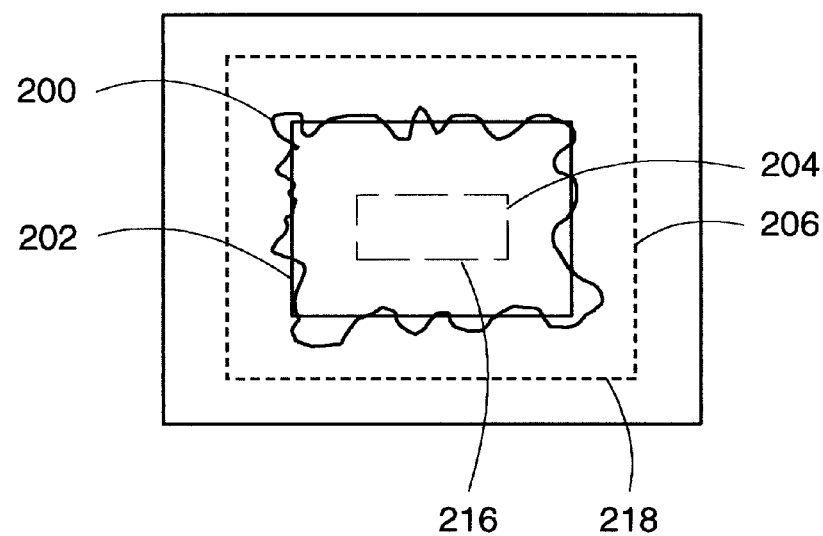
FIG. 4 shows the definition and adjustment of In and Out boundaries.

FIG. 4 shows in detail the definition of In and Out boundaries. The initial boundary $B_{init}$ 200 is the one initially provided by the user assistance (FIG. 3) as an approximation of the image feature's true object boundary B 202. Since the user is attempting to trace the real boundary as closely as possible, it is known that the real video object boundary is not too far away from $B_{init}$ 200. Therefore, an interior In boundary $B_{in}$ 204 and an exterior Out boundary $B_{out}$ 206 are selected to limit the searching area for the real object boundary. $B_{in}$ lies strictly inside the image feature while $B_{out}$ lies outside the image feature.

Preferably, morphological operators are used to obtain $B_{in}$ and $B_{out}$. Morphology is a method of performing shape-based processing that allows extraction of portions of an image. Morphology is applicable to 2D and 3D data, and works well with segmentation methods, since segmentation was developed for processing multidimensional images. The following is a brief overview of the erosion and dilation ($B_{IN}$ and $B_{OUT}$) operations. More detailed mathematical definitions can be found in many textbooks.

For dilation of a set X by symmetrical structuring S, the dilation is the locus of the center of S when S touches X. This can be written as $\delta_s(X) = \{x+s, x \in X, s \in S\}$, which is also known as Minkowski addition. Similarly, for erosion of a set X by a symmetrical structuring S, the erosion is the locus of center of the structuring element S when S is included in X. This can be written as $\epsilon_s(X) = \{y, \forall s \in S, y+S \in X\}$, which is Minkowski subtraction. Here, $B_{in} = \epsilon_s(B_{init})$, and $B_{out} = \delta_s(B_{init})$, $\epsilon$ and $\delta$ are respectively morphological erosion and dilation operators, where $B_{in} \subseteq B_{init} \subseteq B_{out}$.

The term erosion refers to an operation in which a structure element of particular shape is moved over the input image, and wherever the structure fits completely within the boundaries of a shape in the input image, a pixel is placed then in an output image. The net effect is that eroded shapes are smaller in size in the output image, and any input shapes smaller than the size of the probe disappear altogether (being smaller means they cannot contain the structure element). The term dilation refers to an operation in which a structure element is moved over the input image, and when the structure element touches the boundary of a shape in the input image, then a pixel is placed in the output image.

Preferably a square structure element s will be used for the erosion and dilation operations, although it is understood by those skilled in the art that different shapes may be used to achieve different results. With use of a proper user interface, a user can interactively choose the size and shape of the structure element, as well as perform preliminary trials of the effectiveness of the element so chosen, so long as the selection satisfies $B_{in} \subseteq B \subseteq B_{out}$.

Pixels lying along $B_{in}$ 204 and $B_{out}$ 206 respectively represent pixels belonging inside and outside the semantic video object defined by the user.

After defining the In and Out boundaries, the next step is to classify (see FIG. 1, step 106) each pixel between $B_{out}$ and $B_{in}$ to see determine whether it belongs to the semantic video object or not (i.e. determine whether it is an interior pixel). Classification means employing some test to determine whether a pixel belongs to a particular group of pixels; in this case, classification refers to determining whether a particular pixel belongs to Out pixels (pixels outside the semantic video object) or to In pixels (pixels inside the object). Defining In and Out boundaries has reduced the classification search space since the boundaries give representative pixels inside and outside of the semantic object. It is understood by those skilled in the art that different classification methods may be used to classify pixels.

Classifying a pixel requires finding cluster centers and then grouping (classifying) pixels as belonging to a particular cluster center. Two types of cluster centers are defined, the first being an In cluster-center 216 for pixels inside the semantic video object, and the second being a Out cluster-center 218 for those pixels outside of the object. The more cluster centers that are defined, the more accurately a pixel may be classified. Since we already know that $B_{in}$ and $B_{out}$ identify inside and outside pixels, a preferred method is to define cluster centers to be all of the pixels along the $B_{in}$ and $B_{out}$ boundaries.

Cluster centers are denoted as $\{I_0, I_1, \ldots, I_{m-1}\}$ and $\{O_0, O_1, \ldots, O_{n-1}\}$, where $I_s$ and $O_s$ are 5-dimensional vectors (r, g, b, x, y) representing the color and position values for each center. As denoted, there are m In cluster vectors and n Out cluster vectors. To classify the pixels, the three-color components (r, g, b) and the pixel location (x, y) are used as the classification basis. To group the pixels, each pixel inside the subset of pixels defined by $B_{in}$ and $B_{out}$ (a reduced search area) is assigned to the closest cluster center. Once the cluster centers have been defined, assigning pixels to a cluster center is by one of two methods. The first method is through pixel-wise classification (see FIG. 5), and the second method by morphological watershed classification (see FIG. 6), which produces results superior over pixel-wise analysis.

Pixel-wise Classification

Figure 5:
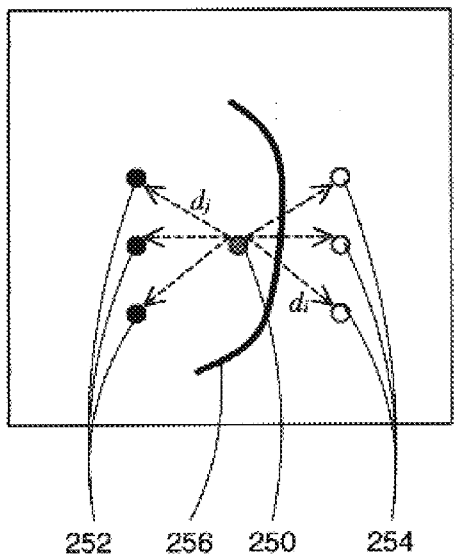
FIG. 5 shows an example of pixel-wise classification for object boundary identification.

FIG. 5 shows an example of pixel-wise classification. For each pixel p 250 between the In 252 and Out 254 boundaries, which surround the object's real boundary 256, the pixel's absolute distance to each cluster center is computed, such that $$d_i = W_{color} * (|r-r_i| + |g-g_i| + |b-b_i|) + W_{coord}(|x-x_i| + |y-y_i|), \ 0 \leq i < m,$$

$$d_j = W_{color} * (|r-r_j| + |g-g_j| + |b-b_j|) + W_{coord}(|x-x_j| + |y-y_j|), \ 0 \leq j < n,$$

where $W_{color}$ and $W_{coord}$ are the weights for the color and coordinate information. The summation of $W_{color}$ and $W_{coord}$ is 1. As noted above, preferably each pixel of the In and Out boundary is used to define a cluster center is defined to be pixels along the In and Out boundaries; shown are three representative pixels from each boundary 252, 254.

A pixel 250 is assigned to a cluster-center 252, 254 according to its minimal distance from a cluster-center. If the pixel is classified to one of the In cluster-centers 252, then the pixel is considered inside the user-defined semantic object. If a pixel is assigned to one of the Out clusters 254, then the pixel is considered to be outside the semantic object. A precise semantic object boundary is located at the meeting of the In and Out pixel regions. That is, as pixels are classified, In and Out regions are grown around the cluster centers. When there are no more pixels to classify, the boundary where the In and Out regions meet defines the semantic object's precise boundary. The final In area constitutes the segmented semantic video object (i.e. the identified real border 202 of FIG. 4).

A drawback to such pixel-wise classification is that it requires an object to have a color fairly different from the background. Although this is often the case (and is usually pre-arranged to be so, e.g. blue-screening), when the colors are close, edges will be imprecisely snapped to the middle of the interior and exterior outlines, depending on where the user draws the outline and the expanded number of pixels. (The term snapped represents the cumulative effect of classifying pixels, in which the In and Out Borders are effectively moved closer to the actual object boundary.) An additional drawback is that during classification, no use is made of a pixel's spatial relation to neighboring pixels. That is, a pixel could be tagged with higher-level semantic-type characteristics of the image (e.g. sizes, shapes and orientation of pixel regions), which would facilitate segmentation and reconstruction of the image. But pixel-wise classification ignores the spatial relations of pixels, resulting in a process sensitive to noise, and which may also destroy pixel geometrical relationships.

Watershed Classification

Figure 6:
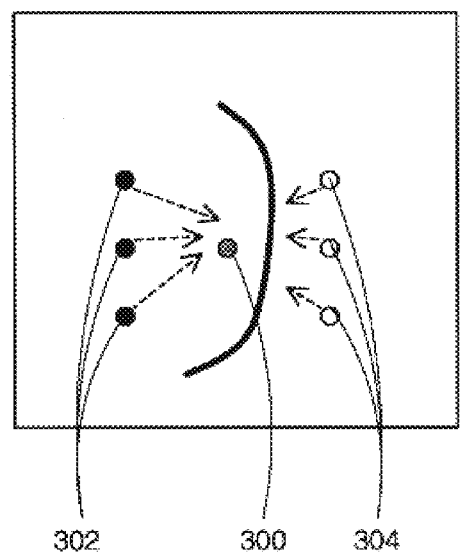
FIG. 6 shows an example of morphological watershed pixel-classification for object boundary identification.

FIG. 6 shows a Morphological watershed classification approach, a preferred method over pixel-based classification. The morphological watershed approach overcomes the pixel-based limitation of color distinctiveness, and it also uses the semantic-type information contained in pixel spatial relationships.

Program code for implementing the morphological watershed method starts from cluster centers and approaches each pixel p between the clusters of $B_{in}$ 302 and $B_{out}$ 304, and is based upon an extension to a gray-tone only region-growing version of the watershed algorithm to provide a multi-valued watershed method able to handle color images (see Gu Ph.D.).

This multi-valued watershed starts from a set of markers extracted from the zones of interest and extends them until they occupy all the available space. As with pixel-based classification, preferably markers are chosen to be the pixels of the In and Out borders. The available space to classify is then the points between $B_{in}$ 302 and $B_{out}$ 304. The multi-valued watershed classification process differs from the classical pixel-wise gray-scale approach which does not emphasize spatial coherence of the pixels. The classical pixel-wise gray-scale approach just uses a distance function to measure the similarity of two pixels. In contrast, the multi-valued watershed method chooses a point because it is in the neighborhood of a marker and the similarity between the point and marker is the highest at that time than between any other pair of points and neighborhood markers.

Calculation of similarity can be divided into two steps. First, the multi-valued representation of the marker is evaluated. Second, the difference between the point and multi-valued representation is calculated. The multi-valued representation of the marker uses the multi-valued mean of the color image over the marker. The distance function is defined as the absolute distance $$d_i=|r-r_i|+|g-g_i|+|b-b_i|, \quad 0<i<(m+n).$$

Intuitively, two filling floods are starting from In and Out positions, where these floods run into the middle place where the object boundary is defined. In this method, the spatial coherence is considered in the region-growing procedure. Therefore, the result is much less sensitive to the existing noise in the data.

The efficacy of a multi-valued watershed approach depends on the scanning method used. Preferred implementations use code for a scanning method which uses a hierarchical queue. (See Meyer, Color image segmentation, $4^{th}$ International Conference on Image Processing and its applications, pp. 303–304, Netherlands, May 1992.) A hierarchical queue is a set of queues with different priorities. Each queue is a first-in-first-out data structure. The elements processed by the queue are the pixel positions in the space, which also defines the way of scanning. The hierarchical queue structure bears the notion of two orders: the priority of the queues and the order inside a queue. At any time, the pixel position pulled out the queue is the one that is in the queue of highest priority and entered that queue the earliest. If the queue with higher priority has been empty, the pixel in the first non-empty queue of lower priority is considered.

Figure 7:
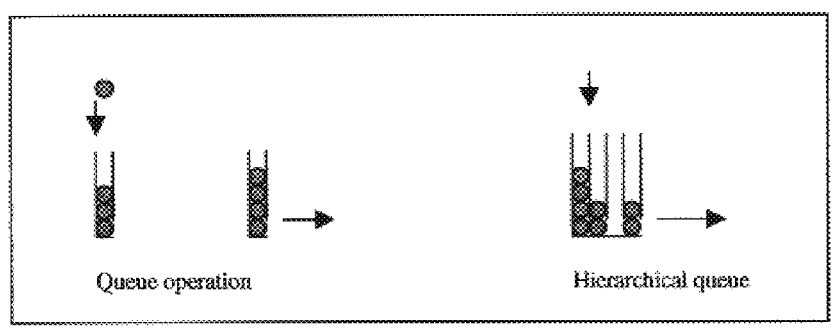
FIG. 7 shows a hierarchical queue structure used by the FIG. 6 watershed algorithm.

FIG. 7 shows a hierarchical queue structure that can be used by the FIG. 6 multi-valued watershed algorithm. Once the In and Out markers are extracted, the classification decision step (FIG. 1, step 106) is fulfilled by the multi-valued watershed to classify all uncertain areas between $B_{in}$ and $B_{out}$ to the In and Out markers. The priority in the hierarchical queue is defined as the opposite of the distance between the pixel concerned and the representation of the marker. In practice, the representation of the marker is calculated as its mean color value.

Generally, a multi-valued watershed is composed of two stages: initialization of the hierarchical queue and the flooding. The initialization consists of putting all the neighborhood pixels of all 'in' and 'out' markers into the hierarchical queue according to their similarity with the corresponding markers. The more similar the pair, the higher the priority. Note that it may happen that a pixel is put into different queues several times because it is in the neighborhood of several markers.

After the initialization, the flooding procedure starts. The flooding follows a region growing process (e.g. defining a region based upon pixels sharing a certain characteristic), but from a set of known markers and under the constraint of the In and Out boundaries defining the scope of the classification process. The flooding procedure begins to extract a pixel from the hierarchical queue. If this pixel has not yet been classified to any marker, the distance between this pixel and all the neighboring markers are calculated. At last, this pixel is classified to the most similar marker, and the multi-valued representation of that marker is then updated to take into account this new arrived pixel. Similarly, all pixels in the neighborhood of the recently classified pixel are then processed, and they are placed into the hierarchical queue according to their similarity (distance value) to the representation of the marker. The more similar the points, the higher the pixel's priority in the queue. Gradually, all the uncertain areas between $B_{in}$ and $B_{out}$ will be assigned to the markers.

When there are no more pixels to classify, pixels assigned to a In marker are pixels interior to the image feature (semantic video object) defined by the user (FIG. 1, step 110), and pixels assigned to an Out marker are similarly considered pixels exterior to the semantic object. As with pixel-wise classification, the locations where the In and Out pixel regions meet identifies the semantic object's boundary. The combination of all In pixels constitutes the segmented semantic video object.

Semantic Object Tracking

Figure 8:
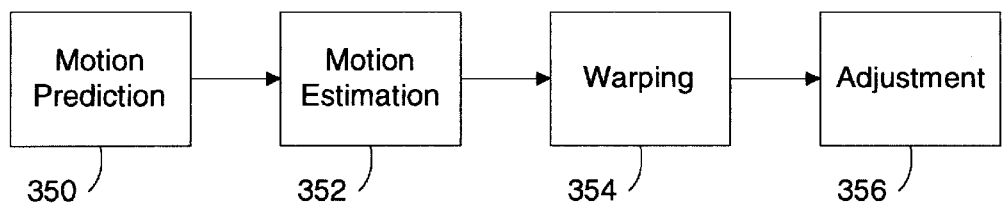
FIG. 8 is a flowchart showing automatic tracking of a semantic object.

FIG. 8 is a flowchart showing automatic subsequent-frame boundary tracking, performed after a semantic video object has been identified in an initial frame, and its approximate boundary adjusted (i.e. after pixel classification). Once the adjusted boundary has been determined, it is tracked into successive predicted frames. Such tracking continues iteratively until the next initial frame (if one is provided for). Subsequent frame tracking consists of four steps: motion prediction 350, motion estimation 352, boundary warping 354, and boundary adjustment 356. Motion estimation 352 may track rigid-body as well as non-rigid motion.

In a given frame sequence, there are generally two types of motion, rigid-body in-place movement and translational movement. Rigid motion can also be used to simulate non-rigid motion by applying rigid-motion analysis to sub-portions of an object, in addition to applying rigid-motion analysis to the overall object. Rigid body motion can be modeled by a perspective motion model. That is, assume two boundary images under consideration are $B_{k-1}(x, y)$ which includes a boundary indicating the previous semantic video object, and a current boundary indicated by $B_k(x', y')$. Using the homogeneous coordinates, a 2D planar perspective transformation can be described as: $x'=(a*x+b*y+c)/(g*x+h*y+1)$ $$y'=(d*x+e*y+f)/(g*x+h*y+1)$$

The perspective motion model can represent a more general motion than a translational or affine motion model, such that if g=h=0 and a=1, b=0, d=0, e=1, then x'=x+c and y'=y+f, which becomes the translational motion model. Also, if g=h=0, then x'=a*x+b*y+c and y'=d*x+e*y+f, which is the affine motion model.

To find the parameters of a perspective motion model, (e.g. a through g), color information inside the semantic video object can be used since it is a good indicator of the global evolution of the semantic video object from frame to frame. For example, assume two color images under consideration are the previous frame $F_{k-1}(x, y)$ and the current frame $F_k(x', y')$. Since the focus is on the evolution of the color information inside the semantic video object, the goal is to minimize the prediction error E over all corresponding pairs of pixels i inside the semantic mask of $F_{k-1}$ and the current frame $F_k$: $E=\Sigma_i w_i*(F_{k-1}(x_i, y_i)-F_k(x_i', y_i'))^2=\Sigma_i w_i*e_i^2$, where $w_i$ is set to 1 if $(x_i, y_i)$ is in object, and $(x_i', y_i')$ is inside the frame, otherwise $w_i$ is set to zero.

Note that (x', y') generally do not fall on integer pixel coordinates. Consequently, an interpolation of the color in $F_k$ should be performed when resampling values. Preferably a bilinear interpolation in $F_k$ is used (see FIG. 9). So, assuming the four integer corner pixel coordinates surrounding (x', y') in $F_k$ are $v_0$, $v_1$, $v_2$ and $v_3$ (v=(x, y) and v'=(x', y')), the interpolated pixel value (see FIG. 9) is $F_k(v')=F_{k-1}(v_0)+(F_{k-1}(v_1)-F_{k-1}(v_0))*p+(F_{k-1}(v_2)-F_{k-1}(v_0))*q+(F_{k-1}(v_3)-F_{k-1}(v_2)-F_{k-1}(v_1)+F_{k-1}(v_0))*p*q$.

Figure 9:
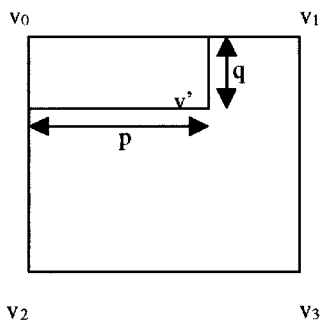
FIG. 9 shows an example of separable bilinear interpolation used by the FIG. 8 tracking.

FIG. 9 shows an example of a separable bilinear interpolation that can be used as the FIG. 8 interpolation step. A Levenberg-Marquardt iterative nonlinear algorithm is employed to perform the object-based minimization in order to get perspective parameters (a, b, c, d, e, f, g). The Levenberg-Marquardt algorithm is a non-linear curve fitting method useful for finding solutions to complex fitting problems. However, other least-squares or equivalent techniques may also be used.

The algorithm computes the partial derivatives of $e_i$ in the semantic video object with respect to the unknown motion parameters (a, b, c, d, e, f, g). That is, $$\frac{\partial e_i}{\partial m_0} = \frac{x_i}{D_i} \frac{\partial I'}{\partial x'} \qquad \frac{\partial e_i}{\partial m_7} = -\frac{y_i}{D_i}\left(x'_i \frac{\partial I'}{\partial x'} + y'_i \frac{\partial I'}{\partial y'}\right)$$

$$a_{kl} = \sum_i \frac{\partial e_i}{\partial m_k} \frac{\partial e_i}{\partial m_l} \qquad b_k = -\sum_i e_i \frac{\partial e_i}{\partial m_k}$$

where $D_i$ is the denominator, $I'=F_k'$, $I=F_{k-1}$ and $(m_0, m_1, m_2, m_3, m_4, m_5, m_6, m_7)=(a, b, c, d, e, f, g, h)$.

From these partial derivatives, the Levenberg-Marquardt algorithm computes an approximate Hessian matrix A and weighted gradient vector b with components, and updates the motion parameter estimate m by an amount $\Delta m = A^{-1}b$.

A preferred implementation of the Levenberg-Marquardt includes the following steps: computing, for each pixel i at location $(x_i, y_i)$ inside the semantic video object, the pixel's corresponding position $(x'_i, y'_i)$, computing the error $e_i$, computing the partial derivative of $e_i$ with respect to the $m_k$, and adding the pixel's contribution to A and b. Then, the system of equations $A\Delta m=b$ is solved and the motion parameters $m^{(t+1)}=m^{(t)}+\Delta m$ are updated. These steps are iterated until error is below a predetermined threshold.

Motion Estimation

Returning to FIG. 8, after prediction 350, the next step is motion estimation 352. It is somewhat axiomatic that a good estimation starts with a good initial setting. By recognizing that in the real world the trajectory of an object is generally smooth, this information can be applied to interpreting recorded data to improve compression efficiency. For simplicity, it is assumed that the trajectory of a semantic video object is basically smooth, and that the motion information in a previous frame provides a good guess basis for motion in a current frame. Therefore, the previous motion parameters can be used as the starting point of the current motion estimation process. (Note, however, that these assumptions are for simplicity, and all embodiments need not have this limitation.) For the first motion estimation, since there is no previous frame from which to extrapolate, the initial transformation is set to a=e=1, and b=c=d=f=g=h=0.

Boundary Warping

Once motion prediction 350 and estimation 352 is computed, the previous boundary is then warped 354 according to the predicted motion parameters (a, b, c, d, e, f, g, h), i.e., the semantic object boundary in the previous frame ($B_{i-1}$) is warped towards the current frame to become to current estimate boundary ($B_i'$). Since the warped points generally do not fall on integer pixel coordinates, an inverse warping process is performed in order to get the warped semantic object boundary for the current frame. Although one skilled in the art will recognize that alternate methods may be employed, one method of accomplishing warping is as follows:

For each pixel (x', y') in $F_i$, the inverse perspective transformation based on motion parameter (a, b, c, d, e, f, g, h) gives the inversely warped pixel (x, y) in $F_{i-1}$. If any of the four integer bounding pixels belongs to the previous object boundary, then (x', y') is a boundary pixel in the current frame. Based on the goal of the motion estimation, it is clear that $B_i'$ is an approximation of the semantic video object boundary in the current frame $B_i$, where this approximation has taken into account the rigid-body motion.

Unfortunately, besides rigid body motion, non-rigid body motion also exists in many real situations. Such motion is difficult to model. As noted above, it can be modeled with rigid-motion analysis. A preferred implementation treats non-rigid motion as a boundary refinement problem to be solved with a boundary adjustment step 406. At this point, the approximation of $B_i$, which is the warped previous object boundary $B_{i-1}$, has already been computed. With $B_i$, the same method used in the initial frame segmentation to solve the boundary adjustment problem may be used again. The only difference is that $B_i'$ in the initial frame is provided interactively by a user and $B_i'$ in the subsequent frame is produced by a motion estimation/motion compensated procedure (i.e. automatically without user intervention). $B_i'$ can be used to generate In boundary $B_{in}'$ and Out boundary $B_{out}'$ in the current frame. Once In and Out boundaries are obtained, the morphological watershed step (see FIG. 6 discussion above) will produce the real semantic object boundary $B_i$.

Figure 10:
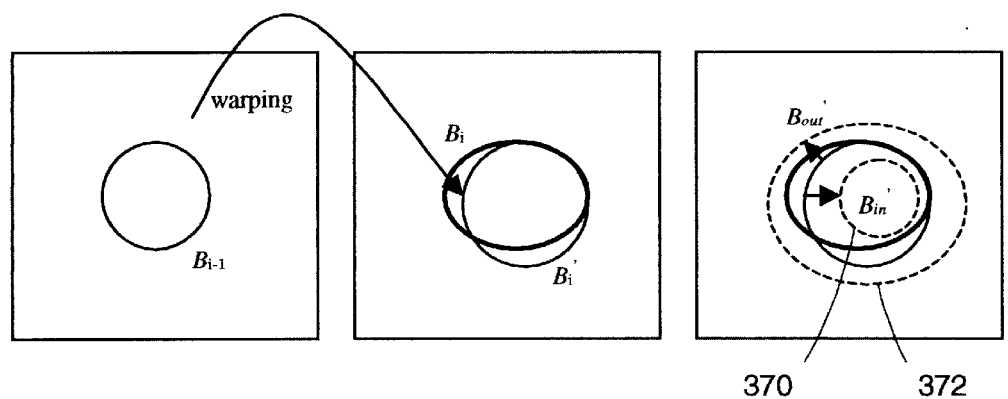
FIG. 10 shows automatic warping of the FIG. 6 identified object boundary to generate a new approximate boundary in a subsequent video frame.

The whole procedure is illustrated in FIG. 10, which shows the creation of a subsequent frame's (see FIG. 2) In 370 and Out 372 boundaries based on such warping.

Sample Output

Figure 11:
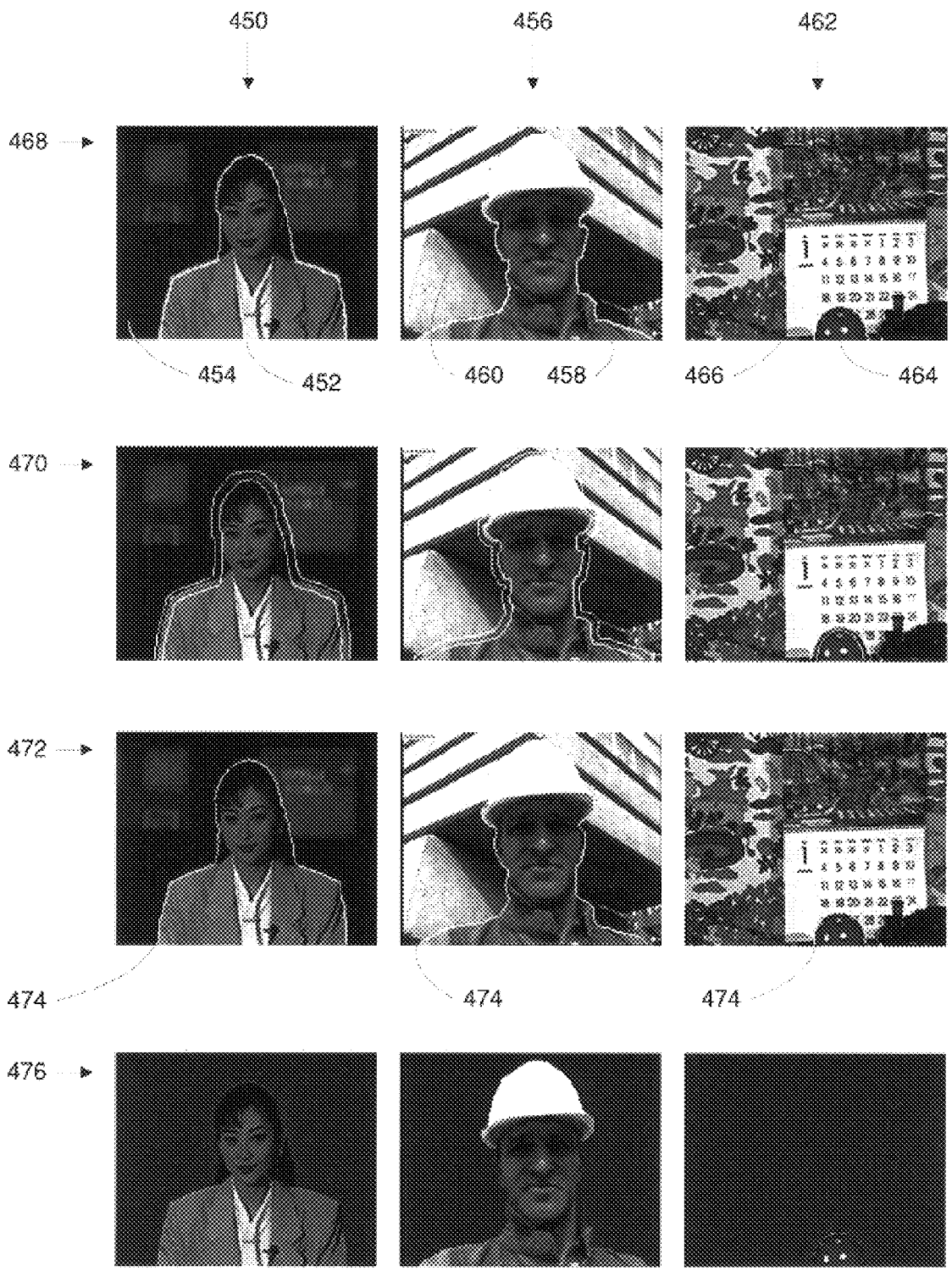
FIGS. 11–13 show sample output from the semantic video object extraction system for different types of video sequences.
Figure 12:
Figure 13:
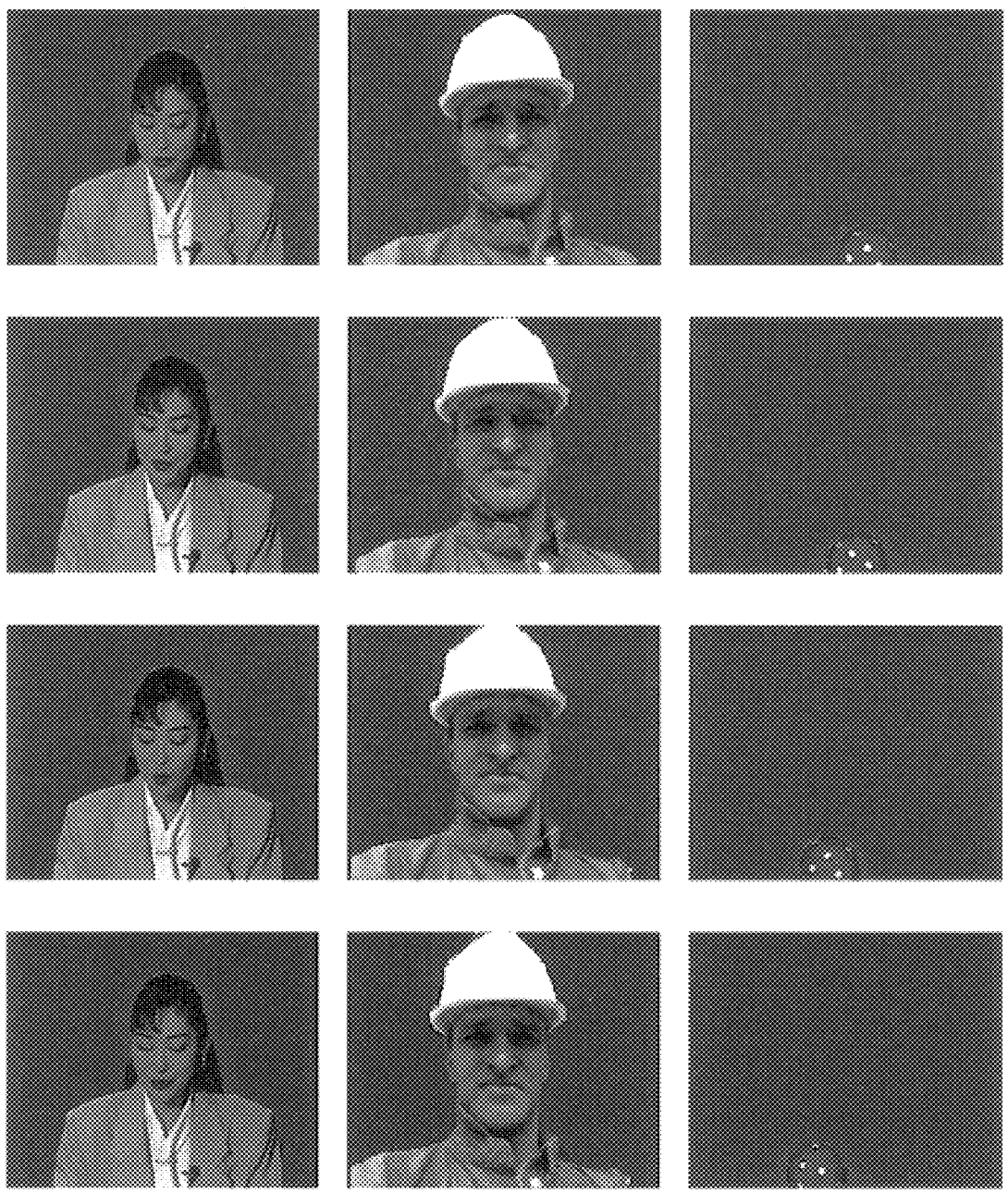

FIGS. 11–13 show sample output from the semantic video object extraction system for several video sequences. These sequences represent different degrees of extraction difficulty in real situations. To parallel the operation of the invention, the samples are broken to parts, the first representing initial frame (user assisted) segmentation results, and the second subsequent frame (automatic) tracking results.

The three selected color video sequences are all in QCIF format (176×144) at 30 Hz. The first Akiyo 450 sequence contains a woman sitting in front of a still background. The motion of the human body is relatively small. However, this motion is a non-rigid body motion because the human body may contain moving and still parts at the same time. The goal is to extract the human body 452 (semantic video object) from the background 454. The second Foreman 456 includes a man 458 talking in front of a building 460. This video data is more complex than Akiyo due to the camera being in motion while the man is talking. The third video sequence is the well-known Mobile-calendar sequence 462. This sequence has a moving ball 464 that is traveling over a complex background 466. This sequence is the most complex since the motion of the ball contains not only translational motion, but also rotational and zooming factors.

FIG. 11 shows initial frame segmentation results. The first row 468 shows an initial boundary obtained by user assistance; this outline indicates an image feature within the video frame of semantic interest to the user. The second row 470 shows the In and Out boundaries defined inside and outside of the semantic video object. For the output shown, the invention was configured with a size of 2 for the square structure element used for dilation and erosion. The third row 472 shows the precise boundaries 474 located using the morphological segmentation tool (see FIG. 6 above). The forth row 476 shows the final extracted semantic objects.

FIG. 12 shows subsequent frame boundary tracking results. For the output shown, the tracking was done at 30 Hz (no skipped frames). Each column 478, 480, 482 represents four frames randomly chosen from each video sequence. FIG. 13 shows the corresponding final extracted semantic video objects from the FIG. 12 frames. As shown, the initial precise boundary 474 has been iteratively warped (FIG. 8, step 354) into a tracked 484 boundary throughout the video sequences; this allows implementations of the invention to automatically extract user-identified image features.

Conclusion

Having illustrated and described the principles of the present invention in a preferred embodiment, and several variations thereof, it should be apparent to those skilled in the art that these embodiments can be modified in arrangement and detail without departing from such principles. In view of the wide range of embodiments to which the principles of the invention may be applied, it should be recognized that the detailed embodiment is illustrative and should not be taken as limiting the invention. Accordingly, we claim as our invention all such modifications as may come within the scope and spirit of the following claims and equivalents thereto.

We claim:

1. A method of semantic object tracking of an object in a sequence of video frames, the method comprising:

for an approximate boundary near a border of an object in a first video frame,
    defining an inner boundary inside of the approximate boundary;
    defining an outer boundary outside of the approximate boundary; and
    expanding the inner boundary while contracting the outer boundary to converge upon the border of the object in the first video frame;
determining a motion transformation function representing the transformation of the object between the first video frame and a second video frame, wherein the determining comprises matching the object in the first video frame to the object in the second video frame; and
defining a new approximate boundary for the object in the second video frame based upon the motion transformation function.

2. The method of claim 1 further comprising:
repeating the method of claim 1 for the new approximate boundary so as to automatically track the object between the second video frame and a third video frame.

3. A computer readable medium having stored therein computer-executable instructions for causing a computer programmed thereby to perform the method of claim 1.

4. The method of claim 1 wherein the defining the new approximate boundary includes, for each of plural pixels of the object in the second video frame:
    applying the inverse of the motion transformation function to the pixel to determine a corresponding pixel in the first video frame;
    based upon proximity of the corresponding pixel to the border in the first video frame, determining whether the pixel of the object in the second video frame is part of the new approximate boundary for the object in the second video frame.

5. A computer readable medium having stored therein computer-executable instructions for causing a computer programmed thereby to perform a method of identifying an object in a sequence of video frames, the method comprising:
    based upon input received from a user, defining an approximate boundary near a border of an object in a first video frame;
    automatically defining an inner boundary inside of the approximate boundary;
    automatically defining an outer boundary outside of the approximate boundary; and
    expanding the inner boundary and contracting the outer boundary to identify the border of the object in the first video frame, the identified border at the convergence of the inner boundary and the outer boundary.

6. The computer readable medium of claim 5 wherein movement of the object is tracked across the sequence of video frames, further comprising:
    determining a transformation of the object between the first video frame and a second video frame; and
    based upon the transformation, defining a second approximate boundary for the object in the second video frame.

7. The computer readable medium of claim 6, wherein the method further comprises:
    repeating the method of claim 6 for the second approximate boundary, including:
        determining a second transformation between the second video frame and a third video frame; and
        based upon the second transformation, defining a third approximate boundary for the object in the third video frame.

8. The computer readable medium of claim 5 wherein the expanding the inner boundary and contracting the outer boundary includes:
    sampling pixels within the object to define at least one inside cluster-center pixel represented in a multi-valued format;
    sampling pixels outside of the object to define at least one outside cluster-center pixel represented in the multi-valued format; and
    for each of plural pixels between the inner boundary and the outer boundary, classifying the pixel according to similarity to one of the at least one inside cluster-center and at least one outside cluster-center.

9. The computer readable medium of claim 8 wherein the classifying is pixel-wise.

10. The computer readable medium of claim 8 wherein the classifying is morphological watershed-based.

11. The computer readable medium of claim 5 wherein E is a morphological erosion operator, wherein O is a morphological dilation operator, wherein $B_{init}$ is the approximate boundary, wherein the defining the inner boundary satisfies the morphological relation $B_{in}=E(B_{init})$, and wherein the defining the outer boundary satisfies the morphological relation $B_{out}=O(B_{init})$.

12. A method of tracking motion of an object across multiple video frames, the method comprising:
    defining a first boundary approximating a perimeter of an object in a first video frame;
    determining a global motion transformation indicating movement of the object between the first video frame and a second video frame; and
    applying the global motion transformation to define a second boundary approximating the perimeter of the object in the second video frame.

13. The method of claim 12, further comprising:
    defining an inner boundary inside the first boundary;
    defining an outer boundary outside the first boundary; and
    snapping the inner and outer boundaries to identify the perimeter of the object in the first frame, wherein the snapping includes expanding the inner boundary and contracting the outer boundary, and wherein the global motion transformation is applied to the identified perimeter to define the second boundary.

14. The method of claim 13 further including:

based upon the second boundary, automatically identifying the perimeter of the object in the second frame;

computing an error value for the automatically identified perimeter of the object in the second frame; and if the error value exceeds a predetermined threshold, prompting a user to identify the perimeter of the object in the second frame.

15. The method of claim 12 wherein non-rigid motion is tracked across multiple video frames by determining a global motion transformation for movement of the object and by identifying a local motion transformation for movement of at least one sub-object within the object.

16. A computer readable medium having stored therein computer-executable instructions for causing a computer programmed thereby to perform the method of claim 12.

17. The method of claim 12 wherein the applying the global motion transformation includes, for each of plural pixels of the object in the second video frame:

applying the inverse of the global motion transformation to the pixel to determine a corresponding pixel in the first video frame;

if the corresponding pixel is within proximity of the perimeter of the object in the first video frame, classifying the pixel of the object in the second video frame as being part of the second boundary.

18. The method of claim 17 wherein a first corresponding pixel has non-integer coordinates, and wherein the first corresponding pixel is within the proximity of the perimeter of the object in the first video frame if at least one neighboring integer-coordinate pixel is part of the perimeter of the object in the first video frame.

19. The method of claim 12 wherein the determining the global motion transformation includes comparing color information within the object in the first video frame to color information within each of plural prospective matching objects in the second video frame, thereby tracking evolution of color information within the object.

20. The method of claim 12 wherein the determining the global motion transformation includes solving for plural parameters of the global motion transformation by approximating minimum error between color information within the object in the first video frame and color information within each of plural prospective matching objects in the second video frame.

21. The method of claim 20 wherein the plural parameters initialize a second global motion transformation indicating movement of the object between the second video frame and a third video frame.

22. A computer readable medium having stored therein computer-executable instructions for causing a computer programmed thereby to perform a method of automatically tracking a segmented, semantic video object in a video sequence, the method comprising:

segmenting a semantic video object within a first video frame of a video sequence, a boundary defining the semantic video object within the first video frame, wherein a user at least in part guides placement of the boundary based upon a semantic criterion; and automatically tracking the semantic video object in one or more subsequent video frames based upon a global motion model of the semantic video object.

23. The computer readable medium of claim 22 wherein the segmenting further comprises:

receiving placement input from the user, the placement input for placing an initial boundary approximation for the semantic video object based upon the semantic criterion;

automatically refining the initial boundary approximation to derive the boundary defining the semantic video object; and receiving acceptability input from the user as to whether the automatic refinement accurately segments the semantic video object.

24. The computer readable medium of claim 22 further comprising:

requesting user assistance in a second segmenting operation if an error value for said automatically tracking exceeds an error threshold in a subsequent video frame.

25. The computer readable medium of claim 22 wherein the automatic tracking comprises iteratively:

determining the global motion model of the semantic video object;

based upon the global motion model, defining a boundary approximation for the semantic video object in one of the one or more subsequent video frames; and automatically refining the boundary approximation.

26. A system for tracking a semantic video object through a sequence of video frames, the sequence including one or more I-frames and one or more P-frames, the system comprising code for:

segmenting a semantic video object within a first I-frame, wherein a boundary segments the semantic video object within the first I-frame;

tracking the semantic video object automatically into one or more subsequent frames, wherein the tracking for each of the one or more subsequent frames comprises:

estimating global motion of the semantic video object into the subsequent frame;

if a tracking error for the global motion estimation satisfies a tracking error threshold, determining the boundary for the semantic video object in the subsequent frame as a P-frame; and if the tracking error fails the tracking error threshold, determining the boundary for the semantic video object in the subsequent frame as a second I-frame.

* * * * *